United States Patent [19]

Montgomery et al.

[11] Patent Number: 5,447,683

[45] Date of Patent: Sep. 5, 1995

[54] BRAZE FOR SILICON CARBIDE BODIES

[75] Inventors: Frederick C. Montgomery, Escondido; Holger H. Streckert, San Diego, both of Calif.

[73] Assignee: General Atomics, San Diego, Calif.

[21] Appl. No.: 148,928

[22] Filed: Nov. 8, 1993

[51] Int. Cl.$^6$ ............ C22C 37/10; C22C 38/34
[52] U.S. Cl. ............... 420/117; 420/424; 420/428; 420/436; 420/580; 420/583; 420/588; 420/578; 148/423; 148/425; 148/442; 228/121; 228/262.9; 219/85.13
[58] Field of Search ............ 420/428, 436, 439, 440, 420/583, 588, 400–402, 406, 411–413, 416–417, 421, 424, 427, 430–431, 434, 435, 513, 555, 556, 576, 578–580, 117–118; 148/423, 425, 442; 228/262.9, 121; 219/85.11, 85.13

[56] References Cited

U.S. PATENT DOCUMENTS

| | | | |
|---|---|---|---|
| 3,813,759 | 6/1974 | Heap et al. | 228/121 |
| 4,499,360 | 2/1985 | Rottenbacher | 219/85 H |
| 4,505,747 | 3/1985 | Glover et al. | 420/428 |
| 4,645,115 | 2/1987 | Kamigaito et al. | 228/121 |
| 4,690,793 | 9/1987 | Hitachi et al. | 376/136 |
| 4,784,313 | 11/1988 | Godziemba-Maliszewski | 228/194 |
| 5,182,080 | 1/1993 | Beltran et al. | 420/588 |

OTHER PUBLICATIONS

Chemical Abstracts, vol. 79, No. 10, Sep. 10, 1973, p. 236.
Chemical Abstracts, vol. 80, No. 22, Jun. 3, 1974, p. 171.
Loehman and Tomsia, "Joining of Ceramics," *Ceramic Bulletin* 67:375–380 (1988).
McDermid and Drew, "Thermodynamic Brazing Alloy Design for Joining Silicon Carbide," *J. Am. Soc.* 74:1855–1860 (1991).
Rabin, B., "Joining of Silicon Carbide/Silicon Carbide Composites and Dense Silicon Carbide Using Combustion Reactions in the Titanium-Carbon-Nickel System," *J. Am. Cer. Soc.* 75:131–135 (1992) (no month available).

Primary Examiner—David A. Simmons
Assistant Examiner—Sean Vincent
Attorney, Agent, or Firm—Fitch, Even, Tabin & Flannery

[57] ABSTRACT

Dense monolithic SiC or SiC ceramic composites are strongly bonded using brazing compositions which, in their preferred composition, include a braze alloy consisting essentially of less than 50 weight percent silicon and at least two metals from the group of Fe, Cr, Co and V and produce a joint suitable for use in a high neutron flux environment. Brazing is carried out at a temperature of about 1200° to 1500° C. in an inert atmosphere and is complete in about 15 minutes. Broadly, a genus of brazing compounds are disclosed which include between about 10 and about 45 weight percent silicon and at least two elements selected from the following group: Li, Be, B, Na, Mg, P, Sc, Ti, V, Cr, Mn, Fe, Co, Zn, Ga, Ge, As, Rb, Y, Sb, Te, Cs, Pr, Nd, Ta, W and Tl.

19 Claims, No Drawings

BRAZE FOR SILICON CARBIDE BODIES

This invention relates to the brazing of silicon carbide bodies and more particularly to methods and compositions for joining dense silicon carbide bodies via a thermochemical bonding technique which employs a brazing composition that includes silicon in an amount less than 50 weight percent thereof.

BACKGROUND OF THE INVENTION

Ceramics such as silicon carbide are brittle in nature and have little plastic deformability even at high temperature. A number of brazing techniques have been developed for joining ceramics such as silicon carbide; however, no ceramic braze exists which has a melting point in the temperature range desired for silicon carbide and which is suitable for use in a high neutron flux environment. In such an environment, for example, within a fusion reactor, the effects of neutron-induced swelling and neutron activation must be taken into consideration. These become particularly important considerations for silicon carbide bodies which are presently under investigation for prospective use as first wall structural materials in a fusion reactor. Moreover, chemical compatibility between the brazing materials, the silicon carbide structures and the operating environment are other important factors that must be taken into consideration.

Therefore, the search has continued to develop improved brazing compositions for adequately joining dense silicon carbide bodies, particularly bodies that will be employed in a high neutron flux environment.

BRIEF SUMMARY OF THE INVENTION

A thermochemical bonding technique for joining silicon carbide materials has been developed which relies upon high-temperature capillary action, diffusion and interfacial reactions to provide strong joints between dense silicon carbide bodies. The characteristics of the joints are such that they have a coefficient of thermal expansion compatible to silicon carbide and are low in neutron activation characteristics; therefore, these joints are suitable for use in Joining components for the construction of a fusion reactor vessel or the like where a high neutron flux environment will be encountered. More specifically, the invention provides a method of high-temperature brazing of dense silicon carbide bodies using a braze which includes silicon in an amount of less than 50 weight percent and which in its preferred form includes an alloy with silicon of at least two metals selected from the group consisting of chromium, cobalt, iron and vanadium.

DETAILED DESCRIPTION OF THE PREFERRED EMBODIMENTS

Silicon carbide bodies which are used for various structural applications can be dense sintered ceramic material, usually referred to as monolithic SiC, or they can be fiber-reinforced ceramic matrix composites (CMCs) or the like. Generally, dense silicon carbide materials are used for such structural purposes, which materials will have a porosity of about 20 percent or less. Monolithic silicon carbide bodies preferably have a density of at least about 85% and more preferably have a density equal to or greater than about 95% of the theoretical density of SiC. When fiber-reinforced CMCs are used, the matrix is silicon carbide and the fibers are preferably silicon carbide fibers. However, carbon fibers or other suitable ceramic fibers may also be employed in SiC matrix composites. In a silicon carbide fiber-reinforced silicon carbide matrix composite, the SiC fibers may constitute about 40–50 volume percent of the composite, with the remainder being vapor-deposited silicon carbide or silicon carbide which has been produced by the pyrolytic decomposition of an organosilicon material, such as a suitable polycarbosilane resin. Such composites may be produced by chemical vapor deposition (CVD), often using the method of forced-flow chemical vapor infiltration (CVI), so as to reach a theoretical density of at least about 85 percent, and preferably the remaining porosity following CVI is not greater than about 10%. Overall, the silicon carbide bodies should be understood to include both monolithic silicon carbide and such silicon carbide composites as discussed above.

In order to prepare two dense SiC bodies for bonding to each other, the surfaces to be joined are preferably machined to have complementary shapes, e.g. two flat surfaces, or two concave and convex shapes having the same radius of curvature. In some instances, it may be possible to form a foil from the alloy to be employed as the brazing composition and to locate the foil between the two surfaces to be joined. However, the braze alloys will generally be employed in the form of powder or paste which is applied to at least one, but preferably to both, of the surfaces of the two silicon carbide bodies to be joined. No great force need be applied to press the surfaces into contact with each other. A pressure of about 20,000 pascals (20 kPa) is considered adequate.

The braze which is employed is one which readily wets the surface of a dense silicon carbide body and which forms a strong diffusion bond thereto generally by carrying out an interfacial chemical reaction with the SiC. The brazing operation may be carried out at a temperature at about the melting point of the alloy or just thereabove, which temperature should be sufficiently high so that high-temperature capillary action occurs in the interfacial region between the two surfaces being joined. The braze should create a strong joint, and most preferably the coefficient of thermal expansion (CTE) is compatible with the CTE of the dense silicon carbide body. In an instance wherein the resultant product having such joint is to be used in a high neutron flux environment, the effects of neutron-induced swelling and activation on the material of the joint should be minimal.

A genus and several subgenuses of brazing compositions have been developed which meet the foregoing criteria, all of which compositions include silicon in an amount less than 50 weight percent of the brazing composition. Brazing compositions which are useful for this purpose consist essentially of silicon plus at least two elements selected from the group consisting of lithium (Li), beryllium (Be), boron (B), sodium (Na), magnesium (Mg), phosphorous (P), scandium (Sc), titanium (Ti), vanadium (V), chromium (Cr), manganese (Mn), iron (Fe), cobalt (Co), zinc (Zn), gallium (Ga), germanium (Ge), arsenic (As), rubidium (Rb), yttrium (Y), antimony (Sb), tellurium (Te), cesium (Cs), praseodymium (Pr), neodymium (Nd), tantalum (Ta), tungsten (W), and thallium (Tl). Of this group of elements, preferably at least one of them is a metal selected from Fe, Cr, Co, V, Zn, Ti and Y. In one preferred embodiment, both of the two additional elements which make up the alloy with silicon are metals selected from this group of Fe, Cr, Co, V, Zn, Ti and Y. Within this group of alloys certain brazing compositions have particularly preferred bonding characteristics for dense silicon carbide; these brazing compositions consist essentially of alloys of silicon and at least two of the following four metals: Cr, Co, V and Fe. Within this overall group of alloys those which contain about 10 to about 45 weight percent (w/o) Si and at least about 30 w/o Co and preferably about 30–65% Co have very good braze qualities. Also, within this particularly preferred group, there are three families that are presently most preferred: (a) alloys of silicon, chromium and cobalt wherein the alloy consists essentially of about 10 to about 45 weight percent (w/o) silicon, at least about 15 weight percent chromium and the remainder cobalt; (b) alloys of silicon, chromium and iron; and (c) alloys of silicon, iron and cobalt.

More specifically, the 3-element alloy (a) family of brazes preferably contains between about 25 and 50 weight percent (more preferably about 25–40 w/o) chromium along with the 10 to 45 weight percent Si, and more preferably about 10 to 40 w/o; in such brazes, cobalt is preferably present in the range of about 30 to about 55 weight percent, and more preferably about 35–50 w/o.

In the 3-element alloy family (b) which includes silicon, chromium and iron, silicon is preferably present in an amount between about 10 and about 30 weight percent, chromium is present in an amount between about 50 and about 70 weight percent, and iron is present in an amount between about 10 and about 30 weight percent.

In the other preferred 3-element family (c), the alloy preferably contains between about 10 and about 30 weight percent silicon, between about 10 and about 30 weight percent iron, and between about 50 and about 70 weight percent cobalt.

These alloys generally have melting points between about 1200° C. and about 1500° C., and they are formed by heating to such temperatures under an inert atmosphere. Brazing temperatures near the melting point of the alloy or slightly thereabove, i.e. up to about 100° C. thereabove, are generally employed, and such result in a strong bond between silicon carbide bodies. The brazing of the two dense silicon carbide bodies is preferably performed by heating under the application of some mild pressure; for example, two silicon carbide bodies may be forced into contact with each other under a light pressure of about 20 kPa. Dependent of course upon the melting point of the particular alloy in question, brazing is frequently carried out at a temperature between about 1200° C. and about 1300° C. over a time period of about 5 minutes to about 1 hour. Generally, however, a very strong bond is obtained after heating under appropriate pressure and temperature conditions for between about 10 and about 20 minutes. Because of the tendency of the elements which make up these alloys to oxidize, brazing is preferably carried out either in a vacuum or blanketed by a protective inert gas, such as argon, helium or nitrogen. However, if the brazing can be accomplished within a period of about 10 minutes or less, it may be possible to carry it out in the ambient atmosphere.

Although it might be possible to deposit the individual elements sequentially or in pairs onto the surfaces to be joined, by evaporation, electrolytically, by sputter deposition or by electron beam deposition or the like, the elements are preferably first alloyed; thereafter, the alloy, in the form of a foil, a powder, or a paste, is applied to one or both of the surfaces to be joined in a suitable manner. The powder form of the alloy is conveniently made into a paint or a paste suspension by using a suitable nonreactive carrier, selected from among the many well-known in this art, which allows it to be applied by spraying, brushing, spreading or the like. Such surfaces may then be subjected to low temperature heat to remove the carrier, if desired, before the brazing operation is begun. The heat for the brazing operation can be supplied in any suitable manner, e.g. in an electrical resistance furnace, by induction heating or even by convection heating in an inert atmosphere.

The following examples illustrate certain presently preferred brazing methods which should be understood to be merely illustrative and not limiting although they exemplify the best modes presently known to the inventors for carrying out the invention.

EXAMPLE 1

A brazing composition is created in the form of an alloy including about 11 weight percent silicon, about 38.5 weight percent chromium and about 50.5 weight percent cobalt. To form the alloy, the following amounts of the three elements are weighed out: 0.2329 gram of 75 $\mu$m silicon powder; 0.8212 gram of 40 $\mu$m chromium powder; and 1.0751 gram of 40 $\mu$m cobalt powder. The powders are blended together and then ground using a mortar and pestle to assure a relatively uniform dispersion. The ground powder is then placed in a die press and compacted for about 10 minutes to form a short right-circular cylindrical disk using a pressure of about 25 GPa.

The resultant disk is placed in an alumina crucible and disposed in an electrical resistance furnace which is supplied with a helium atmosphere. After heating for about 15 minutes at a temperature of about 1480° C., the material melts and forms a bead which is easily fractured. Following cooling to ambient temperature, the bead is crushed into a powder of about 10–100 $\mu$m particle size. The powder is applied to a small block of high-density silicon carbide composite which is made of woven tows of silicon carbide fibers (constituting about 40 volume percent of the block) and a vapor-deposited silicon carbide matrix, with the porosity of the CMC being slightly less than about 10 percent. The braze alloy powder is brushed onto the largest rectangular surface of one SiC composite block, which block measures about 10 millimeters by 4 millimeters by 3 millimeters, to provide a layer of fairly uniform depth of about 0.5 mm, and then a second block of the same dimensions is placed thereatop. To provide a light load, a block of graphite weighing about 100 grams is placed atop the two-block assembly, which is then placed in an inductively heated furnace. No effort is made to maintain tolerances. Heating is carried out under a helium atmosphere so that the assembly is subjected to a temperature of about 1230° C. for 15 minutes.

Following cool-down, the 2 silicon carbide blocks are examined, and they are found to be strongly joined together. Upon subjecting of the resultant 2-block assembly to high-neutron flux, the integrity of the bond is considered to be well-suited to such conditions.

EXAMPLE 2

The alloy preparation and procedure of Example 1 is repeated except that the proportions of the 3 elements are changed so that the braze has a composition of about 40 weight percent silicon, about 26 weight percent chromium and about 34 weight percent cobalt. A similar powder is produced by forming and then crushing a bead, and such alloy powder is used to join together 2 similar blocks of dense silicon carbide composite material under similar conditions. The brazing operation is carried out by heating under helium to a temperature of about 1235° C. for about 10 minutes. After cool-down, examination shows that a strong bond is again obtained between the 2 blocks. This bond is likewise considered to perform well under neutron radiation conditions.

EXAMPLE 3

The alloy preparation and procedure of Example 1 is once more repeated except that this time the proportions of the 3 elements are changed so that the braze has a composition of about 20 weight percent silicon, about 35 weight percent chromium and about 45 weight percent cobalt. A powder is similarly produced after heating the mixture to about 1550° C. for 15 minutes, and the alloy powder is used to join together 2 similar blocks of dense silicon carbide composite material under similar conditions. The brazing operation is carried out by heating under helium to a temperature of about 1510° C. for about 10 minutes. After cool-down, examination shows that a strong bond is again obtained between the 2 blocks. This bond is also considered to perform well under neutron radiation conditions.

EXAMPLE 4

A brazing composition is created in the form of an alloy including about 17.2 weight percent silicon, about 17.5 weight percent iron and about 65.3 weight percent chromium. To form the alloy, the following amounts of the three elements are weighed out: 0.4186 gram of 75 $\mu$m silicon powder; 1.5796 gram of 40 $\mu$m chromium powder; and 0.4225 gram of 1–5 $\mu$m iron powder. The powders are blended together and then ground using a mortar and pestle to assure a relatively uniform dispersion. The ground powder is then placed in a die press and compacted for about 10 minutes to form a short right-circular cylindrical disk using a pressure of about 25 gigapascals (25 GPa).

The resultant disk is placed in an alumina crucible and disposed in an electrical resistance furnace which is supplied with a helium atmosphere. After heating for about 15 minutes at a temperature of about 1550° C., the material melts into a bead which is easily fractured. Following cooling to ambient temperature, the bead is crushed into a powder of about 10–100 $\mu$m particle size. The powder is applied to a small block of high-density silicon carbide CMC which is formed from woven fabric of tows of silicon carbide fibers (which constitute about 40 volume percent of the block) and a vapor-deposited silicon carbide matrix, with the porosity of the CMC being slightly less than about 10 percent. The braze alloy powder is brushed onto the largest rectangular surface of one SiC composite block which measures about 10 millimeters by 4 millimeters by 3 millimeters, and a second block of the same dimensions is placed thereatop. A graphite block weighing about 100 grams is placed atop the two-block assembly which is then disposed in an electric furnace. Heating is carried out under a helium atmosphere so that the assembly is subjected to a temperature of about 1460° C. for 15 minutes.

Following cool-down, the 2 silicon carbide blocks are examined, and they are found to be strongly joined together. Upon subjecting of the resultant 2-block assembly to high-neutron flux, the integrity of the bond is considered to be well-suited to such conditions.

EXAMPLE 5

A brazing composition is created in the form of an alloy including about 20 weight percent silicon, about 20 weight percent iron and about 60 weight percent cobalt. The powders are blended together and then ground and compacted as before. After heating for about 15 minutes at a temperature of about 1550° C., the molten material forms a bead, and the bead thereafter is crushed into a fine powder about 10–100 $\mu$m in size. The braze alloy powder is then brushed onto a 10 millimeters by 4 millimeters rectangular surface of a SiC composite block, and a second block of the same dimensions is placed thereatop. Heating is carried out under a helium atmosphere as in Example 1 so that the assembly is subjected to a temperature of about 1500° C. for about 10 minutes. Following cool-down, the 2 silicon carbide blocks are examined and they are found to be strongly joined together.

Although the invention has been described with regard to certain preferred embodiments which constitute the best mode presently known to the inventors, it should be understood that various modifications and changes as would be obvious to one having the ordinary skill in this art may be made without departing from the scope of the invention which is defined by the claims appended hereto. For example, although alloys of the particular compositions stated are felt to have particular advantages, the weight percentages of any one of the 3 elements in the braze compositions employed in Examples 1 to 5 can generally be varied by about 10%, or as much as about 20%, with the other two elements being varied in proportionate compensating amounts, while retaining good brazing qualities for silicon carbide materials. Although the testing was carried out with SiC composite materials, other testing shows that monolithic SiC blocks can be similarly strongly bonded using the braze compositions of the invention.

Particular features of the invention are set forth in the claims which follow.

What is claimed is:

1. A brazing composition for use in the high temperature joinder of silicon carbide materials, which composition has a melting point of 1200° C. or above and consists essentially of an alloy of at least about 10 weight percent of a metal selected from the group consisting of Cr, Fe and V, Si in an amount of at least about 17 weight percent and not more than about 45 weight percent, and Co in an amount of at least about 30 weight percent.

2. A brazing composition according to claim 1 which consists essentially of between about 25 and about 40 weight % Cr, between about 17 and about 40 weight % Si and between about 35 and about 50 weight % Co.

3. A brazing composition according to claim 1 wherein Si is present between about 20 and about 40 weight percent, Cr is present between about 26 and about 35 weight percent, and the balance is Co which is present between about 34 and about 45 weight percent.

4. A brazing composition consisting essentially of Si in an amount between about 17 and about 20 weight percent, Fe in an amount between about 17 and 20 weight percent, and the remainder being either Cr or Co in an amount of at least about 60 weight percent.

5. A method for high temperature reaction brazing of silicon carbide bodies, which method comprises depositing on at least one of said silicon carbide bodies a braze composition consisting essentially of Si and at least two metals selected from the group consisting of Fe, Cr, Co and V, one metal of said at least two metals constituting at least about 10 weight % and another metal of said at least two metals constituting at least about 30 weight %, Si constituting at least about 10 weight % but less than 50 weight % so that said at least two metals constitute a greater weight percent of said braze composition than Si, and pressing said bodies together and heating to a reaction temperature.

6. A method according to claim 5 wherein Cr is said one metal and Cr and Si are in said braze composition in amounts of at least about 25 weight % Cr and between about 17 and about 45 weight % Si.

7. A method according to claim 6 wherein Cr is in said braze composition in an amount of between about 25 and about 50 weight % Cr and wherein the remainder is said another metal which is Co.

8. A method according to claim 7 wherein Co is in said braze composition in an amount of between about 30 and about 55 weight % Co.

9. A method according to claim 5 wherein said braze composition consists essentially of between about 25 and about 40 weight % of said one metal which is Cr, between about 20 and about 40 weight % Si and between about 35 and about 50 weight % of said another metal which is Co.

10. A method according to claim 5 wherein said braze composition consists essentially of between about 50 and about 70 weight % of said another metal which is Cr, between about 17 and about 30 weight % Si and between about 10 and about 30 weight % of said one metal which is Fe.

11. A method according to claim 5 wherein said braze composition consists essentially of between about 50 and about 70 weight % of said another metal which is Co, between about 20 and about 30 weight % Si, and between about 10 and about 30 weight % of said one metal which is Fe.

12. A method according to claim 5 wherein Co is said another metal and Co and Si are in said braze composition in amounts of at least about 30 weight % Co and between about 20 and about 45 weight % Si.

13. A method for high temperature reaction brazing of silicon carbide bodies, which method comprises depositing on at least one of said silicon carbide bodies a braze composition consisting essentially of Si and at least two metals selected from the group Consisting of Fe, Cr, Co and V, with said at least two metals constituting a greater weight percent of said braze composition than Si, with Si being present in said braze composition in an amount between about 20 and about 45 weight %, and with Co being present in said braze composition in an amount between about 30 and about 65 weight %, and pressing said bodies together and heating to a reaction temperature.

14. A method according to claim 13 wherein the remainder of said braze composition is Fe.

15. A method according to claim 13 wherein the remainder of said braze composition is Cr.

16. A method for high temperature reaction brazing of silicon carbide bodies, which method comprises depositing on at least one of said silicon carbide bodies a braze composition consisting essentially of Si and at least two elements selected from the group consisting of Li, Be, B, Na, Mg, P, Sc, Ti, V, Cr, Mn, Fe, Co, Zn, Ga, Ge, As, Rb, Y, Sb, Te, Cs, Pr, Nd, Ta, W and Tl said Si constituting between about 10 and about 45 weight % thereof, one element of said at least two elements constituting at least about 10 weight % and another element of said at least two elements constituting at least about 30 weight %, pressing said bodies together and heating to a reaction temperature of 1200° C. or above.

17. A method according to claim 16 wherein said one of said at least two elements which is present at at least 10 weight % is Fe, Cr, Co, V, Zn, Ti or Y and wherein Si is present in an amount between about 17 and about 45 weight % thereof.

18. A method according to claim 17 wherein said braze composition contains between about 10 and about 30 weight % of said one element which is Fe.

19. A method according to claim 17 wherein said braze composition consists essentially of about 11 weight percent Si, about 38.5 weight percent Cr, and about 50.5 weight percent Co.

* * * * *